US008649761B2

(12) United States Patent
Duan (10) Patent No.: US 8,649,761 B2
(45) Date of Patent: Feb. 11, 2014

(54) SERVICE CHARGING METHOD, SERVICE CHARGING SYSTEM, NETWORK ACCESS SERVER AND PROTOCOL RESOLVING DEVICE (75) Inventor: Haifeng Duan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 765 days.

(21) Appl. No.: 12/539,857

(22) Filed: Aug. 12, 2009

(65) Prior Publication Data
US 2010/0008271 A1 Jan. 14, 2010

Related U.S. Application Data (63) Continuation of application No. PCT/CN2008/070596, filed on Mar. 27, 2008.

(30) Foreign Application Priority Data

Mar. 28, 2007 (CN) .......................... 2007 1 0088831

(51) Int. Cl.
H04M 11/00 (2006.01)
H04L 12/14 (2006.01)
H04M 15/00 (2006.01)
G06Q 30/04 (2012.01)
H04L 29/06 (2006.01)

(52) U.S. Cl.
CPC ............ *H04L 12/1425* (2013.01); *H04L 12/14* (2013.01); *H04L 29/06585* (2013.01); *H04L 29/06578* (2013.01); *H04L 29/06605* (2013.01); *H04M 15/64* (2013.01); *G06Q 30/04* (2013.01)
USPC .............................. 455/406; 370/252; 370/392

(58) Field of Classification Search
CPC .................... H04L 29/06578; H04L 29/06605
See application file for complete search history.

(56) References Cited

U.S. PATENT DOCUMENTS

| 2003/0096592 A1 | 5/2003 | Moreau et al. |
| 2004/0128688 A1 | 7/2004 | Seo |
| 2004/0184432 A1 | 9/2004 | Gateva et al. |
| 2006/0008063 A1 | 1/2006 | Harnesk et al. |
| 2006/0193344 A1 | 8/2006 | Nie et al. |
| 2008/0270299 A1 | 10/2008 | Peng |

FOREIGN PATENT DOCUMENTS

CN          1327324 A          12/2001
(Continued)

OTHER PUBLICATIONS

Office Action issued in corresponding European Patent Application No. 08715332.6, mailed Oct. 10, 2011.

(Continued)

Primary Examiner — Ian N Moore
Assistant Examiner — Jackie Zuniga Abad
(74) Attorney, Agent, or Firm — Brinks Gilson & Lione (57) ABSTRACT A service charging method, including: receiving a service packet, performing a protocol resolution on the service packet and obtaining charging information when determining that the protocol resolution needs to be performed on the service packet; and performing a service charging according to the charging information and a preset charging policy. The invention further provides a service charging system, a network access server and a protocol resolving device. Thus, it is easier and more convenient for a user to use a service, and no complex traffic back-patching solution needs to be implemented.

10 Claims, 5 Drawing Sheets (56) References Cited

FOREIGN PATENT DOCUMENTS

| | | |
|---|---|---|
| CN | 1536811 | 10/2004 |
| CN | 1674517 | 9/2005 |
| CN | 1744644 A | 3/2006 |
| CN | 1852382 | 10/2006 |
| CN | 1867025 A | 11/2006 |
| CN | 101022350 | 8/2007 |
| CN | 100492975 C | 5/2009 |
| EP | 1689119 A1 | 8/2006 |
| WO | 2004/036825 A1 | 4/2004 |

OTHER PUBLICATIONS

Written Opinion of the International Searching Authority issued in corresponding PCT Patent Application No. PCT/CN2008/070596, mailed Jul. 10, 2008.
Office Action issued in corresponding Russian Patent Application No. 2009132464, mailed Feb. 18, 2011.
Office Action issued in corresponding Indonesian Patent Application No. WO0200902492, mailed Apr. 6, 2011.
Office Action issued in corresponding Chinese Patent Application No. 200910129618.7, mailed Sep. 15, 2011.
Office Action issued in corresponding Mexican Patent Application No. MX/a/2009/009679, mailed Feb. 13, 2013.
"General Technical Requirements for WAP Gateway" YD/T, 2003.

SERVICE CHARGING METHOD, SERVICE CHARGING SYSTEM, NETWORK ACCESS SERVER AND PROTOCOL RESOLVING DEVICE

CROSS REFERENCE TO RELATED APPLICATIONS

This application is a continuation of International Patent Application No. PCT/CN2008/070596 filed on Mar. 27, 2008, which claims priority to Chinese Patent Application No. 200710088831.9 filed on Mar. 28, 2007, both of which are incorporated by reference herein in their entireties.

TECHNICAL FIELD

The present invention relates to mobile data service technologies, and in particular, to a service charging method, a service charging system, a network access server and a protocol resolving device.

BACKGROUND ART

At present, with the construction of new generation wireless network, the number of mobile data service users increases rapidly, and the types of mobile data services required by users also increase rapidly. By using high-speed wireless access technology, the existing mobile data service system may provide abundant data services including a multimedia messaging service, a download-type service, a mail service and a streaming service, etc. However, in the current mobile network, only Wireless Application Protocol (WAP) service is defined with a corresponding WAP Gateway (WAPGW), and the gateway only supports services based on WAP 1.X and WAP 2.0, including BROWSE, PUSH and other WAP-based services such as Multimedia Messaging Service (MMS). But for non-WAP service, for example, the mail service based on Simple Mail Transport Protocol (SMTP)/Post Office Protocol Ver3 (POP3)/Interactive Mail Access Protocol (IMAP), the streaming service based on Real Time Transport Protocol (RTP)/Real Time Stream Protocol (RTSP)/Real Time Control Protocol (RTCP) and the download service based on File Transfer Protocol (FTP), etc., no corresponding gateway is defined. Thus, when a user uses the non-WAP service, no corresponding entity in the network provides a support for the control and charging. As a result, the mobile value chain cannot be well controlled and managed, thus the operator degenerates to a simple channel provider.

During the implementation of the invention, the inventors find, via researches, that: in the conventional service charging system, before using a non-WAP service, the user needs to configure Internet Protocol (IP) addresses and port numbers of service gateways corresponding to different services on the user terminal. On one hand, the user terminal must support a related configuration of the service gateway, but most of current user terminals do not support the related configuration. On the other hand, even if the user terminal supports the related configuration of the service gateway, the user still has to configure a corresponding service gateway for each service, thus it is inconvenient for the user to use the non-WAP service.

SUMMARY

The embodiments of the disclosure provide a service charging method, a service charging system, a network access server and a protocol resolving device, therefore it is more convenient for a user to use a service.

The technical solutions according to the embodiments of the disclosure are as follows.

A service charging method includes:
receiving a service packet, performing a protocol resolution on the service packet and obtaining charging information when determining that the protocol resolution needs to be performed on the service packet; and
performing a service charging according to the charging information and a preset charging policy.

A method for obtaining charging information includes:
receiving a service packet; and performing a protocol resolution on the service packet and obtaining charging information when it is determined that the protocol resolution needs to be performed on the service packet.

A service charging system includes: a network access server, a protocol resolving device and a charging subsystem;
the network access server is adapted to receive a service packet and forward the service packet to the protocol resolving device when it is determined that a protocol resolution needs to be performed on the service packet;
the protocol resolving device is connected with the network access server and the charging subsystem and is adapted to perform the protocol resolution on the service packet sent by the network access server and obtain charging information; and
the charging subsystem is adapted to store a preset charging policy and perform a service charging according to the charging policy and the charging information obtained by the protocol resolving device.

A network access server includes:
a packet receiving module adapted to receive a service packet;
a determining unit adapted to judge whether a protocol resolution needs to be performed on the service packet received by the packet receiving module; and
a server sending module adapted to send the service packet on which the protocol resolution needs to be performed, to a corresponding protocol resolving device.

A protocol resolving device includes:
a resolving module, adapted to perform a protocol resolution on a service packet and obtain a transport layer quintuple for transporting a data packet and a dynamic rule based on the transport layer quintuple;
a traffic associating module, adapted to associate a traffic of the service packet based on the transport layer quintuple accumulated by a data packet accumulating module with a traffic of a protocol control packet corresponding to the service packet accumulated by the accumulating module according to the transport layer quintuple obtained by the resolving module via resolving the service packet, and obtain charging information; and
a packet processing module, adapted to process the service packet according to a packet continuation policy generated by a charging subsystem.

A protocol resolving device includes:
a resolving module, adapted to perform a protocol resolution on a service packet and obtain charging information;
a packet processing module, adapted to process the service packet according to a packet continuation policy generated by a charging subsystem.

In the technical solutions according to the embodiments of the disclosure, after it is determined that a protocol resolution needs to be performed on a received service packet, a network access server sends the service packet to a protocol resolving device, and the protocol resolving device and a charging subsystem charge for the service packet. Thus, the charging on WAP service and non-WAP service may be implemented. Moreover, no service gateway needs to be configured by a user before using a service and it is easier and more convenient for the user to use the service.

DETAILED DESCRIPTION

The invention is illustrated in detail in conjunction with the figures and specific embodiments.

A service charging method according to one embodiment of the disclosure includes: receiving a service packet, performing a protocol resolution on the service packet after it is determined that a protocol resolution needs to be performed on the service packet to obtain charging information; and performing a service charging according to the charging information and a preset charging policy.

The service charging method according to the embodiment of the disclosure is described in detail with the service IP packet as an example.

Figure 1:
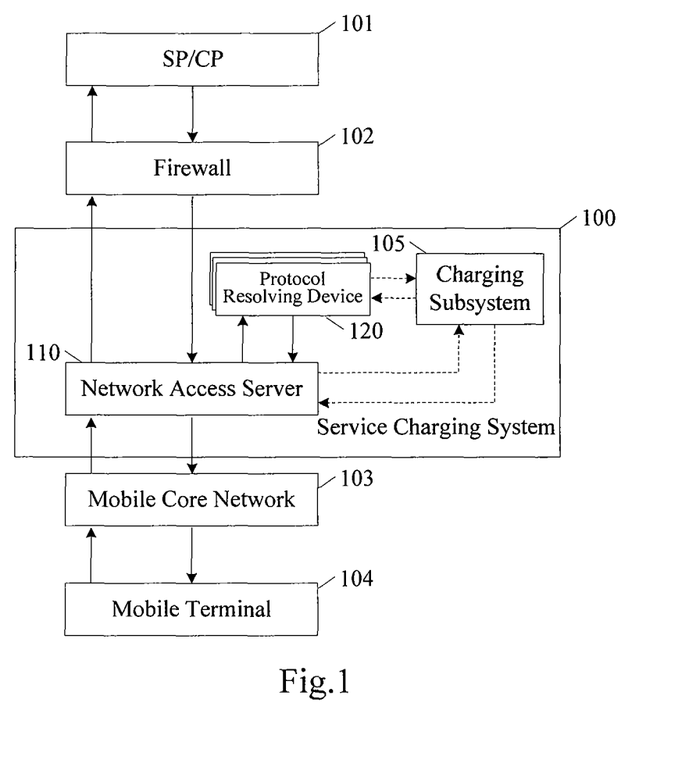
FIG. 1 is a schematic diagram showing the structure and external connection relation of the service charging system according to one embodiment of the disclosure.

FIG. 1 is a schematic diagram showing the structure and external connection relation of the service charging system according to one embodiment of the disclosure. Referring to FIG. 1, a service charging system 100 according to the embodiment of the disclosure includes: a network access server 110, a protocol resolving device 120 and a charging subsystem 105.

The network access server 110 is adapted to receive a service IP packet including a service IP packet sent by the mobile terminal 104 via the mobile core network 103 and a service IP packet sent by the Service Provider (SP)/Content Provider (CP) 101 via firewall 102. When it is determined that the protocol resolution needs to be performed on a service IP packet, the service IP packet is forwarded to a corresponding protocol resolving device 120.

The protocol resolving device 120 is connected with the network access server 110 and the charging subsystem 105 and is adapted to perform the protocol resolution on the service IP packet sent by the network access server 110 and obtain charging information.

The protocol resolving device 120 corresponds to a protocol ID of a protocol, and there are one or more protocol resolving devices corresponding to the same protocol ID. When there are more than one protocol resolving devices corresponding to a protocol ID in a service IP packet, the network access server 110 selects a protocol resolving device with the lightest load from the protocol resolving devices corresponding to the protocol ID in the service IP packet. The protocol includes protocols on which the protocol resolution needs to be performed, for example, SMTP, POP3, IMAP, RTP, RTSP, RTCP and FTP, etc.

The charging subsystem 105 is connected with the protocol resolving device 120 and is adapted to store a preset charging policy and perform a service charging according to the charging policy stored and the charging information resolved by the protocol resolving device 120. It should be noted that, the protocol resolving device 120 and charging subsystem 105 may be configured separately or in combination.

Figure 2:
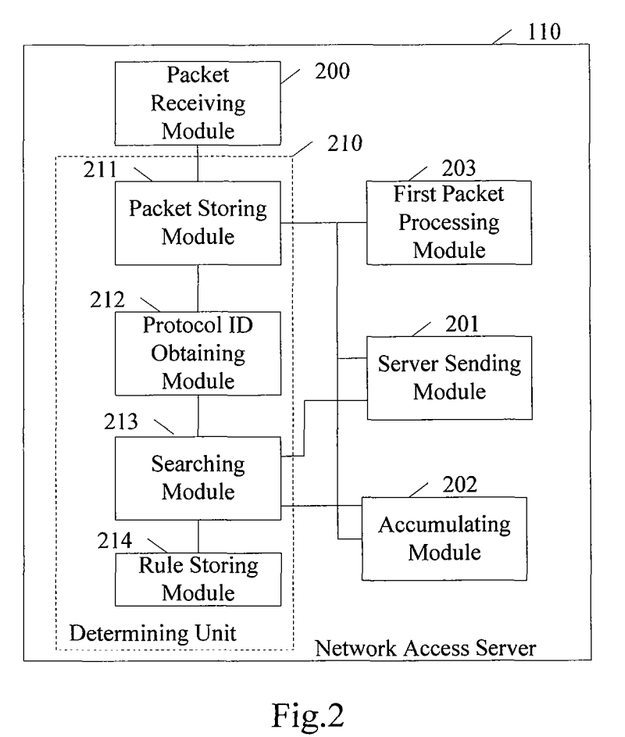
FIG. 2 is a schematic diagram showing the structure of the network access server according to one embodiment of the disclosure.

FIG. 2 is a schematic diagram showing the structure of the network access server according to one embodiment of the disclosure. As shown in FIG. 2, the network access server includes: a packet receiving module 200, a determining unit 210, a server sending module 201, an accumulating module 202 and a first packet processing module 203.

The packet receiving module 200 is adapted to receive a service IP packet.

The server sending module 201 is adapted to send a service IP packet of the service on which the protocol resolution needs to be performed, to a corresponding protocol resolving device.

The determining unit 210 is adapted to judge whether the protocol resolution needs to be performed on the service IP packet, and includes: a packet storing module 211, a protocol ID obtaining module 212, a searching module 213 and a rule storing module 214.

The packet storing module 211 is adapted to store the service IP packet received by the packet receiving module 200.

The protocol ID obtaining module 212 is adapted to obtain the protocol ID from the service IP packet stored in the packet storing module 211.

The rule storing module 214 is adapted to store a preset first static rule and the first static rule stores the protocol ID of a service on which the protocol resolution needs to be performed.

The searching module 213 is adapted to search the first static rule in the rule storing module 214 for a protocol ID obtained by the protocol ID obtaining module 212 from the service IP packet, and send a determination signal for determining that the protocol resolution needs to be performed on the service IP packet to the server sending module 201 if a record matching the protocol ID is found in the first static rule.

The server sending module 201 is further adapted to send the service IP packet of the service on which the protocol resolution needs to be performed, to corresponding protocol resolving device under the control of the determination signal sent from the searching module 213.

The first packet processing module 203 is adapted to process the service IP packet stored in packet storing module 211 according to a packet continuation policy generated by the charging subsystem 105. When the charging subsystem 105 performs a charging operation successfully and generates the packet continuation policy for forwarding the service IP packet, the first packet processing module 203 forwards the service IP packet stored in the packet storing module 211 to the firewall 102 or mobile core network 103.

The rule storing module 214 is adapted to further store a preset second static rule, and the second static rule stores the protocol ID of a service and a method for processing a service IP packet based on the protocol ID.

The accumulating module 202 is adapted to accumulate the traffic or accumulate the duration and traffic of the service IP packet matching the protocol ID stored by the packet storing module 211, according to the record matching the protocol ID in the second static rule and the protocol ID, under the control of the determination signal sent by the searching module 213. If no record matching the protocol ID is searched in the first static rule, the searching module 213 further searches the second static rule in the rule storing module 214 for the protocol ID. If a record matching the protocol ID is searched a determination signal is sent to the accumulating module 202.

When the service charging system 100 further includes a protocol resolving device for a protocol in which the control signaling and data packet are transported separately, the rule storing module 214 further stores the dynamic rule based on transport layer quintuple generated by the protocol resolving device for the protocol in which the control signaling and data packet are transported separately. At this point, the network access server 110 further includes a data packet accumulating module. When the searching module 213 does not find a record matching the protocol ID in the second static rule, the searching module 213 further searches the dynamic rule based on transport layer quintuple. If a record matching the protocol ID is found, the searching module 213 sends a determination signal for determining to accumulate the service IP packet to the data packet accumulating module, and the data packet accumulating module accumulates the traffic or accumulates the duration and traffic of the service IP packet based on the transport layer quintuple, according to the dynamic rule found by the searching module 213 and the transport layer quintuple.

Figure 3:
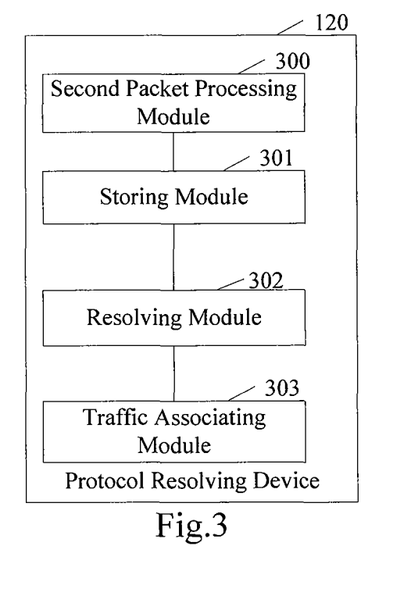
FIG. 3 is a schematic diagram showing the structure of the protocol resolving device for a protocol in which a control signaling and a data packet are transported separately according to one embodiment of the disclosure.

FIG. 3 is a schematic diagram showing the structure of the protocol resolving device for the protocol in which the control signaling and data packet are transported separately according to one embodiment of the disclosure. As shown in FIG. 3, the protocol resolving device 120 includes: a second packet processing module 300, a storing module 301, a resolving module 302 and a traffic associating module 303.

The second packet processing module 300 is adapted to process a service IP packet stored by the storing module 301 according to the packet continuation policy generated by the charging subsystem 105. When the charging subsystem 105 performs a charging operation successfully and generates a packet continuation policy for forwarding the service IP packet, the second packet processing module 300 forwards the service IP packet stored by the storing module 301 to the first packet processing module 203 of the network access server, and the first packet processing module 203 of the network access server forwards the service IP packet to the firewall 102 or the mobile core network 103. When the charging subsystem 105 performs the charging operation unsuccessfully and generates a packet continuation policy for deleting the service IP packet, the second packet processing module 300 deletes the service IP packet stored by the storing module 301.

The storing module 301 is adapted to store the service IP packet sent by the server sending module 201. In practical application, the storing module may be configured in the protocol resolving device or be configured independently in the charging system so as to store the service IP packet.

The resolving module 302 is adapted to perform the protocol resolution on the service IP packet stored by the storing module 301 and obtain a transport layer quintuple for transporting the data packet and a dynamic rule based on the transport layer quintuple.

The traffic associating module 303 is adapted to associate an accumulated traffic of the service IP packet based on the transport layer quintuple generated by the data packet accumulating module with an accumulated traffic of the protocol control packet corresponding to the service IP packet generated by the accumulating module 202, according to the transport layer quintuple obtained by the resolving module 302 via resolving the service IP packet, so as to obtain charging information.

The protocol resolving device 120 for other protocols includes: a second packet processing module 300, a storing module 301 and a resolving module 302.

The second packet processing module 300 is adapted to process the service IP packet stored by the storing module 301 according to the packet continuation policy generated by the charging subsystem 105.

The storing module 301 is adapted to store the service IP packet sent by the network access server 110. In practical application, the storing module may be configured in the protocol resolving device or be configured independently in the service charging system so as to store the service IP packet.

The resolving module 302 is adapted to perform the protocol resolution on the service IP packet stored by the storing module 301 and obtain the charging information.

The network access server according to the embodiment of the invention may be a Gate GPRS Support Node (GGSN, and the GPRS refers to General Packet Radio Service), a Packet Data Service Node (PDSN) or other Network Access Server (NAS), etc.

The protocol ID according to one embodiment of the disclosure may be a port number, an IP address or an IP layer protocol number.

For a service IP packet sent from a mobile terminal to a content providing server, the network access server judges whether the protocol resolution needs to be performed on the service IP packet according to the destination IP address, destination port number and IP layer protocol number in the service IP packet. After it is determined that the protocol resolution needs to be performed, a corresponding protocol resolving device is determined according to the destination IP address, destination port number and IP layer protocol number in the service IP packet.

For a service IP packet sent from a content providing server to a mobile terminal, the network access server judges whether the protocol resolution needs to be performed on the service IP packet according to the source IP address, source port number and IP layer protocol number in the service IP packet. After it is determined that the protocol resolution needs to be performed, a corresponding protocol resolving device is determined according to the source IP address, source port number and IP layer protocol number in the service IP packet.

In the above embodiment of the disclosure, after it is determined that the protocol resolution needs to be performed on a service packet received, the network access server sends the service packet to the protocol resolving device, and the protocol resolving device and a charging subsystem charge for the service packet, so that the charging on WAP service and non-WAP service is implemented and no service gateway needs to be configured by the user before the user uses the service. Thus, it is easier and more convenient for the user to use the service, and the operability of the service is enhanced. In addition, in an embodiment of the invention, the network access server no longer performs the traffic charging on the service on which the content charging needs to be performed, thus the complex traffic back patching does not need to be carried out.

Figure 4:
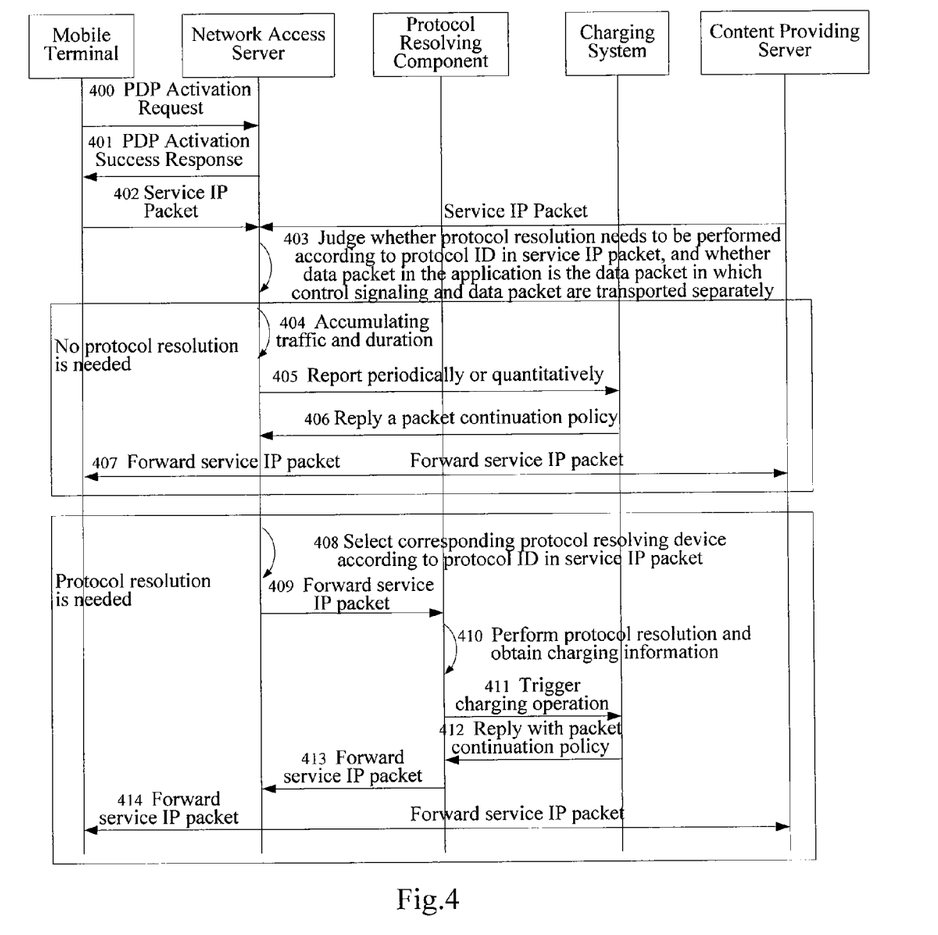
FIG. 4 is a flow chart of the service charging method according to one embodiment of the disclosure.

FIG. 4 is a flow chart of the service charging method according to one embodiment of the disclosure. Referring to FIG. 4, the method includes the following steps.

Step 400-Step 401: A mobile terminal sends a Packet Data Protocol (PDP) activation request to a network access server for obtaining an authentication and admission of the network access server, receives a PDP activation success response replied by the network access server after receiving the PDP activation request, and an IP address is allocated and a data channel between the network access server and the mobile terminal is established.

Step 402: The network access server receives a service IP packet sent by the mobile terminal or a content providing server.

Step 403: The network access server judges whether the protocol resolution needs to be performed on the service IP packet according to a first static rule preset. If the protocol resolution needs to be performed, the flow turns to Step 408. If the protocol resolution does not need to be performed, a second static rule preset is searched. If the record matching the protocol ID in the service IP packet exists in the second static rule, the flow turns to Step 404; if the record matching the protocol ID in the service IP packet does not exist in the second static rule, a dynamic rule prestored is searched. If the dynamic rule based on the transport layer quintuple in the service IP packet exists in the dynamic rule, the packet is processed according to the action in the dynamic rule matched, or the packet is forwarded to a protocol resolving component, or the traffic is accumulated. If the dynamic rule based on the transport layer quintuple in the service IP packet does not exist in the dynamic rule, the traffic of the service IP packet is accumulated and the traffic charging is performed on the service IP packet by the network access server and the charging subsystem, according to the default rule.

In the embodiment of the disclosure, the first static rule is preset in the network access server so as to store the protocol ID of a service on which the protocol resolution needs to be performed.

The second static rule is also preset in the network access server so as to store the protocol ID of a service on which the protocol resolution does not need to be performed and a method for processing a service IP packet based on the protocol ID.

The dynamic rule refers to a method for processing a data packet of a protocol in which the control signaling and data packet are transported separately, and the dynamic rule is sent to the network access server by a protocol resolving device for the protocol in which the control signaling and data packet are transported separately and is generated according to a protocol control packet of the protocol in which the control signaling and data packet are transported separately.

In this step, the protocol ID includes a port number, an IP address and an IP layer protocol number. Well-known services use fixed ports, for example, Hyper Text Transfer Protocol (HTTP) service uses port 80, FTP service uses port 21, and streaming service uses port 554, etc. The network access server searches in the first static rule or the second static rule prestored for a record matching the port number, IP address and IP layer protocol number in the service IP packet.

For a service IP packet sent from a mobile terminal to a content providing server, after the network access server obtains the protocol ID in the service IP packet, the network access searches in the first static rule or the second static rule preset for a record matching the destination IP address, destination port number and IP layer protocol number in the service IP packet. For a service IP packet sent from a content providing server to a mobile terminal, the network access server searches in the first static rule or the second static rule preset for a record matching the source IP address, source port number and IP layer protocol number in the service IP packet.

Step 404: The network access server accumulates the traffic or accumulates the traffic and duration of the service IP packet matching the protocol ID, according to the record matching the protocol ID in the service IP packet found in the second static rule and the protocol ID.

Step 405: The network access server reports the traffic or reports the duration and traffic accumulated to the charging subsystem periodically or quantitatively.

In this step, the network access server reports quantitatively according to the accumulated traffic value, in other words, if the network access server determines that the accumulated traffic increases to a preset traffic value, the network access server reports the traffic value to the charging subsystem. The network access server reports periodically according to the accumulated duration; in other words, if the network access server determines that the accumulated duration increases to a preset duration value, the network access server reports the duration value and corresponding traffic value to the charging subsystem.

Step 406: The network access server receives a packet continuation policy replied by the charging subsystem after charging.

In this step, after receiving the traffic value reported by the network access server, the charging subsystem performs a charging operation according to a charging policy preset in the charging subsystem, and replies a packet continuation policy to the network access server according to the result of the charging operation. If the charging operation is successful, the packet continuation policy is to continue to forward the service IP packet; if the charging operation is unsuccessful, for example, if the charging subsystem does not find a charging policy corresponding to the service IP packet and thus cannot charge for the packet, the packet continuation policy is to delete the service IP packet.

Step 407: According to the packet continuation policy replied by the charging subsystem, the network access server forwards the service IP packet to the content providing server or the mobile terminal, or deletes the service IP packet and ends the flow.

For example, a user terminal uses two services and no static rule and dynamic rule matching the two services exist on the network access server, in other words, the network access server does not find a record matching the protocol ID in the service packets of the two services in the first static rule, the second static rule and the dynamic rule, thus, the traffic of the two services is accumulated simultaneously and is charged simultaneously according to a default rule and charging strategy. If the network access server presets a record matching the protocol IDs of the two services in the second static rule, the traffic of the two services is accumulated respectively and the two services are charged respectively.

Step 408: The network access server selects a corresponding protocol resolving device according to the protocol ID in the service IP packet.

This step is performed after the network access server determines that the service IP packet is a service IP packet of the service on which the protocol resolution needs to be performed.

In this step, the network access server prestores a correspondence between the protocol ID and the IP address of the protocol resolving device, and the network access server searches the IP address of the corresponding protocol resolving device according to the protocol ID in the service IP packet.

If more than one protocol resolving devices correspond to the same protocol ID, the network access server selects the protocol resolving device with the lightest load. For example, the network access server sends a detection message to all the protocol resolving devices corresponding to the protocol ID of the service IP packet, receives response messages from the protocol resolving devices, and determines the protocol resolving device which responds fastest as the protocol resolving device with the lightest load; or, the network access server determines the protocol resolving device with the lightest load according to the load level of each protocol resolving device carried in the response message.

Step 409: The network access server forwards the service IP packet to the corresponding protocol resolving device.

Step 410: The protocol resolving device performs the protocol resolution on the service IP packet, resolves and obtains the charging information of the service IP packet.

In this step, the charging information obtained via the protocol resolution may be the service information of the service IP packet of the service on which the content charging needs to be performed. The charging information may also be the accumulated traffic or the accumulated duration and traffic of the service IP packet of the service on which the traffic charging needs to be performed and the corresponding service information.

In this step, the service information of the service on which the content charging needs to be performed includes Uniform Resource Locator (URL), the source or destination port number, the source or destination IP address, or the service ID and so on.

Figure 5:
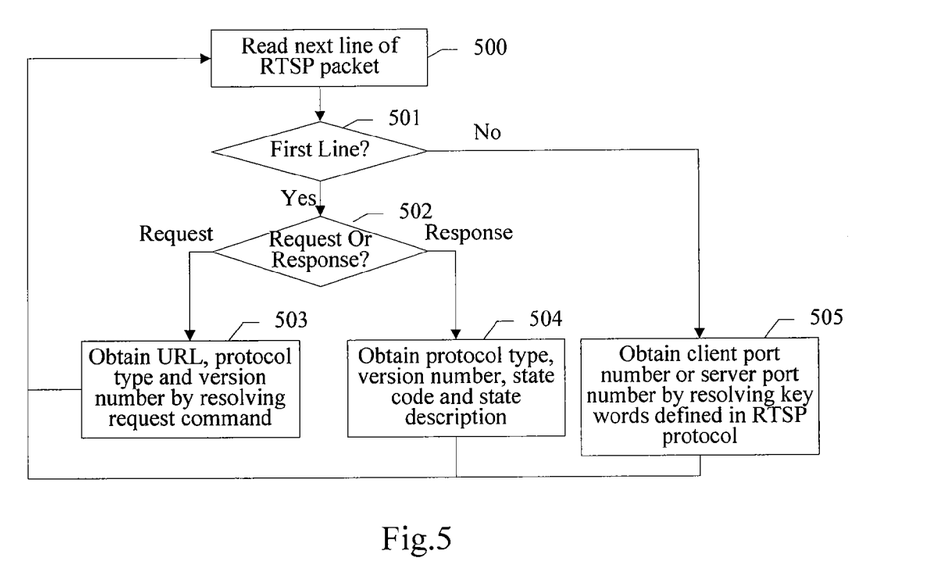
FIG. 5 is a flow chart of the method for resolving RTSP according to one embodiment of the disclosure.

The process of the method for the protocol resolution is now illustrated with the resolution for an RTSP packet as an example.

FIG. 5 is a flow chart of the method for resolving RTSP according to one embodiment of the disclosure. As shown in FIG. 5, the method includes the following steps.

Step 500: The next line of an RTSP packet is read.

Step 501: It is judged whether the next line is the first line, if the next line is the first line, the flow turns to Step 502; otherwise, the flow turns to Step 505.

Step 502: It is judged whether the RTSP packet is a request or a response, if the RTSP packet is a request, the flow turns to Step 503; if the RTSP packet is a response, the flow turns to Step 504.

Step 503: The RTSP request is resolved to obtain the URL, protocol type and version number, and the flow turns to Step 500.

Step 504: The RTSP response is resolved to obtain the protocol type, version number, state code and state description, and the flow turns to Step 500.

Step 505: The client port number or the server port number is obtained by resolving the key words defined in the RTSP, and the flow turns to Step 500.

After the protocol resolving device performs the protocol resolution on the service IP packet, it is judged whether the content charging or traffic charging is to be performed on the service IP packet according to the URL resolved from the service IP packet. If the content charging is to be performed, the flow turns to Step 411; if the traffic charging is to be performed, the traffic is accumulated or the duration and traffic of the service IP packet is accumulated and the flow turns to Step 411.

Step 411: A charging operation is triggered.

In this step, the protocol resolving device sends charging information to the charging subsystem to trigger the charging operation of the charging subsystem.

Step 412: The charging subsystem performs the charging operation, and sends a packet continuation policy to the protocol resolving device according to the charging result after the charging operation.

The charging subsystem selects the charging policy matching the service information to perform the charging operation according to the charging information received, and sends a packet continuation policy to the protocol resolving device according to the charging result. If the charging operation is successful, the packet continuation policy is to forward the service IP packet. If the charging operation is unsuccessful, for example, when the charging subsystem cannot find the charging policy match the charging information and thus cannot perform the charging operation, the packet continuation policy is to delete the service IP packet.

Step 413: The protocol resolving device forwards the service IP packet to the network access server according to the packet continuation policy, and the flow turns to Step 414; or, the protocol resolving device deletes the service IP packet, and the flow ends.

Step 414: The network access server forwards the service IP packet to the content providing server or the mobile terminal, and then the flow ends.

The protocol resolving device in Step 410-Step 414 does not include a protocol resolving device for a protocol in which the control signaling and the data packet are transported separately. When the protocol resolving device receives a service IP packet of the service on which the protocol resolution needs to be performed, the processing procedure is as shown in Step 501-Step 502.

If the service IP packet is a packet in which the control signaling and the data packet are transported separately, for example, an application packet of RTSP/RTP/RTCP and Session Initiation Protocol (SIP), and an application packet of an application in which the streaming control packet and the audio-video packet are transported separately. The protocol control packet and the data packet of the application packet employs different port numbers, the transport layer quintuple for transporting the data packet is dynamically obtained via a negotiation between the content providing server and the mobile terminal, and the transport layer quintuple for transporting the data packet is carried in the protocol control packet and thus can be obtained when the protocol resolving device performs the protocol resolution. In the application packets, most of the data packets are audio and video packets, no content charging needs to be performed on the data packets, and the data volume of the data packets is very large. If the data packets are sent to a corresponding protocol resolving device, for example, to a streaming protocol resolving device, the traffic and processing capacity of the protocol resolving device is occupied, and the processing speed of the protocol resolving device is influenced greatly. In the case that the traffic of the data packets is only accumulated on the network access server, because the transport layer quintuple for transporting the data packets is dynamically obtained via the negotiation between the content providing server and the mobile terminal and which transport layer quintuple may be obtained cannot be predicted, no charging policy matching the transport layer quintuple can be preset on the charging subsystem and the charging operation cannot be performed. In view of above, in the embodiments of the disclosure, packet of the application in which the control signaling and the data packet are transported separately is processed as follows.

Figure 6:
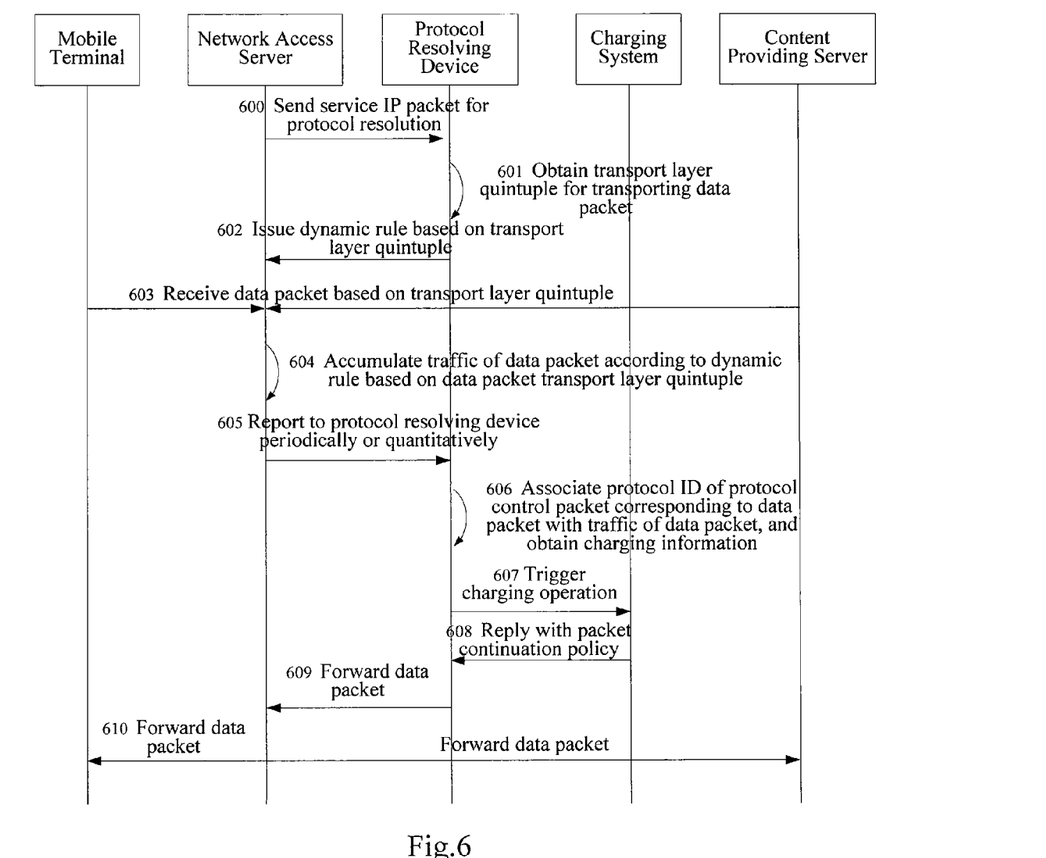
FIG. 6 is a flow chart of the method for charging a packet in which the control signaling and the data packet are transported separately according to one embodiment of the disclosure.

FIG. 6 is a flow chart of the method for charging a packet of an application in which the control signaling and the data packet are transported separately according to one embodiment of the invention. As shown in FIG. 6, the method includes the following steps.

Step 600: The network access server sends a service IP packet received to a protocol resolving device matched for performing the protocol resolution. The protocol resolving device is a protocol resolving device for a protocol in which the control signaling and the data packet are transported separately, and the service IP packet is a protocol control packet of the protocol in which the control signaling and the data packet are transported separately.

Step 601: The protocol resolving device for the protocol in which the control signaling and data packet are transported separately performs the protocol resolution on the protocol control packet received, and obtains the transport layer quintuple for transporting the data packet.

In this embodiment, the transport layer quintuple includes the source IP address, the destination IP address, the source port number, the destination port and the IP layer protocol number for transporting a data packet.

Step 602: The protocol resolving device issues a dynamic rule based on the transport layer quintuple to the network access server.

In this step, the dynamic rule issued indicates that the continuation policy of the service IP packet based on the transport layer quintuple is that: the network access server accumulates the traffic or the duration and traffic of the service IP packet based on the transport layer quintuple according to the transport layer quintuple, and reports the traffic or the duration and traffic to the corresponding protocol resolving device periodically or quantitatively.

Step 603: The network access server receives a service IP packet again, and no record matching the protocol ID in the service IP packet is found in the first static rule and the second static rule preset while a dynamic rule based on the transport layer quintuple is found in the dynamic rule. Thus, the service IP packet is the data packet of the protocol in which the control signaling and the data packet are transported separately.

Step 604: The network access server accumulates the traffic or the duration and traffic of the data packet based on the transport layer quintuple, according to the dynamic rule based on the transport layer quintuple which is found and the transport layer quintuple.

Step 605: The network access server reports the traffic or the duration and traffic accumulated to the corresponding protocol resolving device periodically or quantitatively.

Step 606: The protocol resolving device obtains charging information after associating the traffic of the data packet based on the transport layer quintuple with the protocol control packet corresponding to the data packet.

Step 607: A charging operation is triggered.

In this step, the protocol resolving device sends the charging information to the charging subsystem to trigger the charging operation of the charging subsystem.

Step 608: The charging subsystem performs the charging operation according to a charging policy preset, and replies a packet continuation policy to the protocol resolving device.

Step 609: The protocol resolving device forwards the service IP packet to the network access server according to the packet continuation policy and the flow turns to Step 610; or, the protocol resolving device deletes the service IP packet and the flow ends.

Step 610: The network access server forwards the service IP packet to the mobile terminal or the content providing server.

It may be appreciated by those skilled in the art that, all or part of the steps of the method according to the embodiment of the invention may be accomplished by instructing related hardware via a program, and the program may be stored in a computer-readable medium, for example, ROM/RAM, magnetic disc and compact disc, etc.

It can be seen from above that, in the service charging method, service charging system, network access server and protocol resolving device according to the embodiments of the invention, the network access server performs a corresponding process on the service packet received according to whether the protocol resolution needs to be performed on the service packet. If the protocol resolution needs to be performed, the service packet is sent to the protocol resolving device for the protocol resolution and the charging information is obtained, and the charging subsystem performs the charging operation according to the charging information and the preset charging policy. If the protocol resolution does not need to be performed, the network access server and the charging subsystem performs the traffic charging. Thus, the content charging and traffic charging on WAP and non-WAP services and the control on non-WAP service are implemented. In addition, it is easier and more convenient for a user to use a mobile data service, and it is not needed to input different service gateway configurations for different services.

For a service in which the control signaling and the data packet are transported separately, the network access server performs the traffic charging, the protocol resolving device associates the protocol ID of the protocol control packet corresponding to the data packet with the traffic of the data packet and then sends them to the charging subsystem, and the charging subsystem performs the charging operation. Therefore, the influence on the processing capacity of the protocol resolving device due to the service with a large data volume may be avoided.

Moreover, for the WAP service and non-WAP service on which the content charging needs to be performed, the complex rollback does not need to be performed, thus the implementation of the service charging system is simple. In addition, the precision of the service charging and the operability of the service charging system are improved.

Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

The invention claimed is:

1. A service charging method, comprising:
receiving, by a network access server, a service packet, obtaining, by the network access server, a protocol ID from the service packet;
determining, according to the protocol ID, by the network access server, that a protocol resolution needs to be performed on the service packet and forwarding the service packet to a protocol resolving device;
obtaining, by the protocol resolving device, a transport layer quintuple for transporting a data packet by resolving a protocol control packet if the service packet is protocol control packet of a protocol in which a control signaling and a data packet are transported separately;
generating, by the protocol resolving device, a dynamic rule based on the transport layer quintuple, and sending, by the protocol resolving device, the dynamic rule based on the transport layer quintuple to the network access server; wherein, the dynamic rule indicates that the continuation policy of the service IP packet based on the transport layer quintuple is that: the network access server accumulates the traffic or the duration and traffic of the service IP packet based on the transport layer quintuple according to the transport layer quintuple, and reports the traffic or the duration and traffic to the corresponding protocol resolving device periodically or quantitatively;

receiving, by the network access server, other service packet;

founding, by the network access server, the dynamic rule based on the transport layer quintuple of the other service packet, determining, by the network access server, that the other service packet is the data packet of the protocol in which the control signaling and the data packet are transported separately;

accumulating, by the network access server, according to the dynamic rule based on the transport layer quintuple, the traffic, or the duration and traffic of the data packet based on the transport layer quintuple, and reporting, by the network access server, the traffic, or the duration and traffic accumulated to the protocol resolving device periodically or quantitatively;

associating, by the protocol resolving device, the traffic of the data packet based on the transport layer quintuple with the protocol control packet corresponding to the data packet;

obtaining, by the protocol resolving device, charging information, and sending the charging information to a charging subsystem; and performing, by the charging subsystem, a service charging according to the charging information and a preset charging policy.

2. The service charging method according to claim 1, further comprising:

presetting a first static rule which is configured to store a protocol ID of a service on which the protocol resolution needs to be performed; and determining, according to the protocol ID, that the protocol resolution needs to be performed on the service packet comprises:

searching the first static rule; and determining that the protocol resolution needs to be performed on the service packet if a record matching the protocol ID in the service packet exists in the first static rule.

3. The service charging method according to claim 2, further comprising: presetting a second static rule which is configured to store the protocol ID of the service and a method for processing the service packet based on the protocol ID;

after searching the first static rule, searching the second static rule if no record matching the protocol ID in the service packet received exists in the first static rule;

if the record matching the protocol ID in the service packet received exists in the second static rule, accumulating a traffic or a duration and traffic of the service packet matching the protocol ID according to the method for processing the service packet based on the protocol ID and the protocol ID;

performing the service charging according to the preset charging policy and the traffic or the duration and traffic received.

4. The service charging method according to claim 1, wherein, a first static rule and a second static rule are preset;

the first static rule is configured to store the protocol ID of the service on which the protocol resolution needs to be performed;

the second static rule is configured to store the protocol ID of the service and the method for processing the service packet based on the protocol ID;

before searching the dynamic rule stored, the method further comprises:

searching according to the protocol ID from the another service packet, the first static rule and the second static rule, and searching the dynamic rule based on the transport layer quintuple, if no record matching the protocol ID in the service packet received exists in the first static rule and the second static rule.

5. The service charging method according to claim 1, wherein, after performing the service charging, the method further comprises:

forwarding the service packet if the service charging is performed successfully; and deleting the service packet if the service charging is performed unsuccessfully.

6. The service charging method according to claim 1, wherein, the charging information is at least one of information of a service on which a content charging needs to be performed, and a traffic or a duration and traffic of a service packet of a service on which a traffic charging needs to be performed and service information corresponding to the service packet.

7. A service charging system, comprising: a network access server, a protocol resolving device and a charging subsystem;

the network access server is configured to receive a service packet obtaining a protocol ID from the service packet and forward the service packet to the protocol resolving device when it is determined, according to the protocol ID, that a protocol resolution needs to be performed on the service packet;

the protocol resolving device is connected with the network access server and the charging subsystem and is configured to obtain a transport layer quintuple for transporting the data packet by resolving a protocol control packet if the service packet is protocol control packet of a protocol in which a control signaling and a data packet are transported separately, generate a dynamic rule based on the transport layer quintuple; and send the dynamic rule based on the transport layer quintuple to a rule storing module of the network access server;

wherein, the dynamic rule indicates that the continuation policy of the service IP packet based on the transport layer quintuple is that: the network access server accumulates the traffic or the duration and traffic of the service IP packet based on the transport layer quintuple according to the transport layer quintuple, and reports the traffic or the duration and traffic to the corresponding protocol resolving device periodically or quantitatively; and wherein, the network access server is further configured to receiving a other service packet, obtaining a protocol ID from the another service packet, found the dynamic rule based on the transport layer quintuple of the other service packet, determine the other service packet is the data packet of the protocol in which the control signaling and the data packet are transported separately, and accumulating, according to the dynamic rule based on the transport layer quintuple, the traffic, or the duration and traffic of the data packet based on the transport layer quintuple; and report the traffic, or the duration and traffic accumulated to the protocol resolving device periodically or quantitatively;

the protocol resolving device is further configured to associate the traffic of the data packet based on the transport layer quintuple with the protocol control packet corresponding to the data packet, obtain charging information, and send the charging information to a charging subsystem;

the charging subsystem is configured to store a preset charging policy and perform a service charging according to the charging policy and the charging information obtained by the protocol resolving device.

8. The service charging system according to claim 7, wherein, the network access server comprises:
- a packet receiving module configured to receive the service packet;
- a determining unit, configured to judge whether a protocol resolution needs to be performed on the service packet; and
- a server sending module, configured to send the service packet on which the protocol resolution needs to be performed, to a corresponding protocol resolving device.

9. The service charging system according to claim 8, wherein,
- the rule storing module, is configured to store a preset first static rule which is configured to store the protocol ID of the service on which the protocol resolution needs to be performed;
- a searching module, configured to search for the protocol ID obtained by the protocol ID obtaining module from the service packet in the first static rule stored in the rule storing module, and send a determination signal for determining that the protocol resolution needs to be performed on the service packet to the server sending module if a record matching the protocol ID is found in the first static rule; and
- the server sending module is further configured to send the service packet on which the protocol resolution needs to be performed, to the corresponding protocol resolving device under the control of the determination signal sent by the searching module.

10. The service charging system according to claim 9, wherein, the rule storing module further stores a preset second static rule which is configured to store the protocol ID of the service and a method for processing the service packet based on the protocol ID;
- the network access server further comprises an accumulating module, configured to accumulate a traffic or a duration and traffic of the service packet matching the protocol ID stored in the packet storing module under the control of the determination signal sent by the searching module, according to the record matching the protocol ID in the second static rule and the protocol ID;
- the searching module further searches for the protocol ID in the second static rule stored in the rule storing module if no record matching the protocol ID is found in the first static rule, and sends the determination signal to the accumulating module if the record matching the protocol ID is found;
- the charging subsystem further performs the service charging according to the traffic or the duration and traffic of the service packet accumulated by the accumulating module and the preset charging policy.

* * * * *